Oct. 30, 1928.

W. H. MILLER ET AL 1,689,446

MIXING DEVICE

Filed Dec. 5, 1921

Inventor
William H. Miller
Henry G. Thompson
Thurston Kwis + Hudson
attys

Patented Oct. 30, 1928.

1,689,446

UNITED STATES PATENT OFFICE.

WILLIAM H. MILLER AND HENRY G. THOMPSON, OF CLEVELAND, OHIO.

MIXING DEVICE.

Application filed December 5, 1921. Serial No. 519,941.

The present invention relates to a device adapted to be inserted in a conduit through which gaseous or semi-gaseous material is adapted to pass, the device mentioned serving to cause a thorough mixture of the gaseous or semi-gaseous material which is passing through the conduit.

The device of the present invention finds particular use and merit when used in connection with the intake manifold of an internal combustion engine through which manifold there passes a mixture of gaseous or semi-gaseous fuel mixed with air.

It is well known that in the usual type of engines employing a carburetor, when the air and vaporized or semi-gaseous fuel passes to the intake manifold, the same is seldom thoroughly mixed, and when this is the case the combustion within the cylinders of the internal combustion engine is not so perfectly secured as when there is a thorough mixture of the fuel and air. This is particularly true in cold weather before the engine has become hot, at which time the fuel from the carbureter passes into the manifold and into the cylinders of the engine in large measure in coagulated globules of liquid which are difficult to ignite and which produce deposits of carbon within the cylinder.

With the present device the fuel, even though somewhat imperfectly vaporized or atomized will, when carried by the air through the device, be thoroughly mixed with the air and completely atomized, thereby overcoming the difficulties which have before been recited. Additionally, even when the engine is running hot the passage of the air and fuel through the device of the present invention will more thoroughly mix the fuel mixture and so produce better igniting qualities in the fuel mixture.

The present device is so arranged that it will act upon all portions of the stream of air and fuel which pass through it, but the parts thereof are so arranged as to produce a minimum amount of impedance to the passage of the air and fuel through the device.

Figure 3:
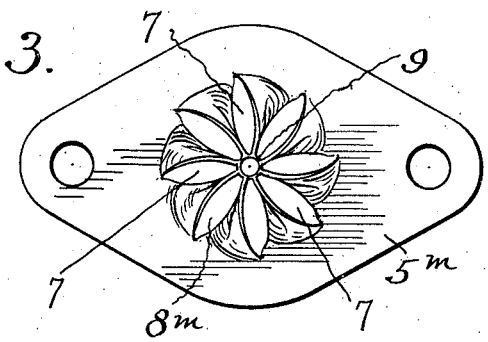
Figure 2:
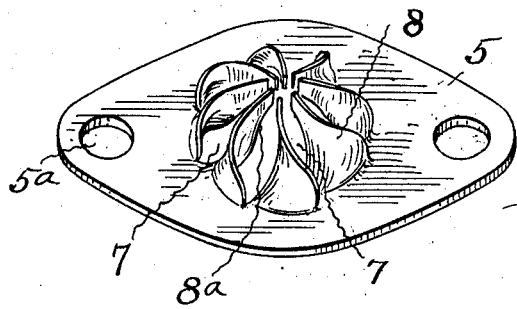
Figure 1:
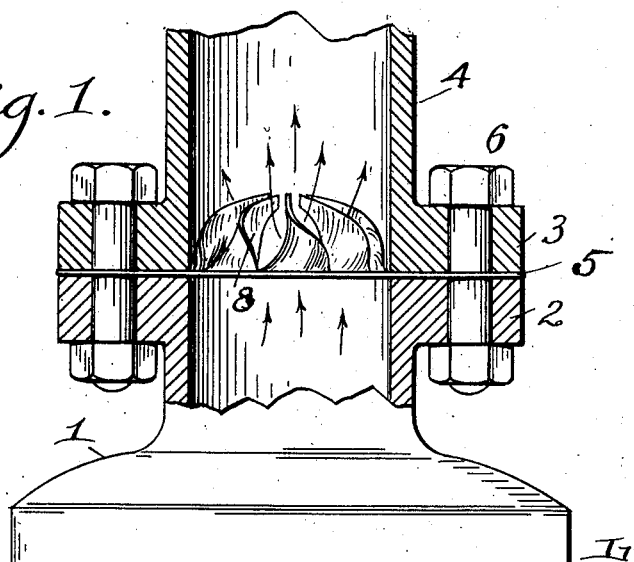

Reference should be had to the accompanying drawings forming a part of this specification, in which Fig. 1 shows in elevation and part in section the upper part of a carbureter, the lower part of an intake manifold with the device of the present invention associated therewith; Fig. 2 is a perspective view showing one form of the device; Fig. 3 is a top plan view of essentially the same construction shown in Fig. 2, but with the inner ends of the vanes united.

Referring to the drawings, 1 may indicate a carbureter or any other source of fuel through which air is passing, vaporizing the same, and burdening the air with the fuel vapor. Usually such devices are provided with a flange 2 which co-operates with a flange 3 carried at the lower portion of an intake manifold 4.

The present device is in the construction shown in the drawings so made as to be insertable at the juncture of the intake manifold and the carbureter. However, as will be appreciated upon further disclosure of the invention, the particular placing of the mixing device of the present invention is not limited to that which is shown in Fig. 1.

Referring to Fig. 2, 5 indicates a base which is suitably shaped to be inserted in a conduit carrying gaseous or semi-gaseous material, and in the form shown in Fig. 2 is adapted for insertion between an intake manifold of an internal combustion engine and a carbureter, as suggested in Fig. 1, and for this purpose the base is provided with openings $5^a$ through which may extend the bolts 6 which co-operate with openings in the flanges 2 and 3 of the carbureter and intake manifold, respectively. When so used the device overlies the flange 2 and is held between the flanges 2 and 3 in the manner shown in Fig. 1.

The base 2 is provided with a central opening 7 and surrounding this opening are a plurality of vanes which are indicated at 8. Each vane at the portion thereof adjacent the base is either formed integral with the base 5 or is attached thereto in any suitable manner, each vane being made in a spiral form, and the spiral is substantially a half-spiral, that is to say, the metal is twisted through less than 180°.

Additionally, attention is called to the fact that the vanes are of diminishing width from the base toward the end of each vane which is remote from the base, and the inner edge, such as indicated at $8^a$, is arranged so as to lie in a common plane with the vertical axis of the opening 7, so that the greater portion of the inner edge of each vane presents a substantially straight edge to the passage of air and gas passing through the device. It will be noted that the portions of each vane which are nearest the base present a curved surface to the gas and air passing through the device so that what may be described as the outer portion of the column of air and gas will when contacting with the curved surface of the vane be deflected toward the center, and not only will the column be deflected, but it will be given a swirling motion at the same time so that as the various portions of the ascending column of air and gas which have been given the swirling motion meet, they will thoroughly mix due to the swirling action which each has.

Reference has before been made to the fact that the inner edges of the vanes 8 present a substantially straight edge to the gas and air as it passes through the device, and this straight edge portion is nearest to the central portion of the opening through the base 5. This offers practically no impedance to the passage of the air and gas through the central portion of the device, and therefore there is no tendency to slow down the engine because of the restraint of the passage of air and fuel to the engine.

Each vane when considered as a unit has a slanting axis so that the vanes overlie the opening 7 in the base 5 and thus gas and air passing through the device must contact with some portions of the various vanes.

Preferably the device is made as a stamping from sheet metal, and when so constructed the vanes are formed from the sheet metal blank and are therefore at their lower or broadest portions integral with the base. This, however, is but one way of making the device, and is not a limiting factor.

In the form of the device shown in Figs. 1 and 2 the inner ends of the vanes approach each other, but are not joined. While in Fig. 3 the device is precisely the same so far as the construction of the base $5^m$ and the vanes $8^m$ is concerned, the inner ends of the vanes are joined to each other as indicated at 9. This feature just referred to makes absolutely no difference in the functioning of the device, but it may be employed if desired so as to form a structure in which the inner ends of the vanes are prevented from any accidental movement from their formed positions.

Having described our invention, we claim:—

1. A mixing device comprising a base plate adapted to be secured between sections of a conduit, said plate having an opening, a plurality of vanes surrounding said opening and extending over said opening, each vane being attached at one end to the base, said vanes being of spiral shape and each having its other end adjacent and in the same vertical plane as the vertical axis of the opening in the base.

2. A mixing device comprising a base plate adapted to extend across a conduit and having an opening therein, a plurality of vanes surrounding said opening and extending laterally from the plate over said opening, each vane at one end being attached to the base and being of diminishing width and spiral shape, said vanes having their inner end portions adjacent to and in the same vertical plane as the vertical axis of the opening in the base.

3. A mixing device comprising a base plate adapted to be secured between sections of a conduit, an opening in said base plate, a plurality of vanes surrounding said opening and extending over said opening, each vane being attached at one end thereof to the base and being of diminishing width from the base and of spiral configuration and each vane being inclined toward the central vertical axis of the opening and terminating adjacent thereto, said vanes substantially covering the central opening in the base.

In testimony whereof, we hereunto affix our signatures.

WILLIAM H. MILLER.
HENRY G. THOMPSON.